United States Patent [19]

Hiroshi et al.

[11] Patent Number: 5,195,059
[45] Date of Patent: Mar. 16, 1993

[54] ACOUSTIC PIPE LENGTH MEASURING APPARATUS

[75] Inventors: Nakamura Hiroshi; Itoh Takanori, both of Tokyo; Natori Masaki, Koganei, all of Japan

[73] Assignee: Tokyo Gas Co., Ltd., Tokyo, Japan

[21] Appl. No.: 857,026

[22] Filed: Mar. 24, 1992

[30] Foreign Application Priority Data

Mar. 27, 1991 [JP] Japan .................................. 3-87921
Mar. 27, 1991 [JP] Japan .................................. 3-89723

[51] Int. Cl.⁵ ............................................. G01S 15/00
[52] U.S. Cl. ..................................... 367/99; 367/902; 367/101
[58] Field of Search ........................... 367/99, 902, 101

[56] References Cited

U.S. PATENT DOCUMENTS 4,584,676 4/1986 Newman ............................. 367/902

FOREIGN PATENT DOCUMENTS 0296392 12/1988 European Pat. Off. .
1-72184 3/1989 Japan .
WO89/01130 2/1989 PCT Int'l Appl. .

OTHER PUBLICATIONS

Th. Gast, et al.; "Laengenmessung mit Luftschall", in: Messen + Pruefen, vol. 19, (1983) Nov., No. 11, pp. 676–681.
Collection of papers regarding lecture of Japanese Acoustic Society; Mar. 1990.

Primary Examiner—Daniel T. Pihulic
Attorney, Agent, or Firm—Townsend and Townsend

[57] ABSTRACT

An acoustic pipe length measuring apparatus for measuring the length of a pipe-like member in accordance with the time between the emission of a pulse-like sound wave from a speaker at one end thereof and the collection of sound waves reflected at the other end thereof, by a microphone, and a sonic velocity, in which data of a sonic velocity at a reference temperature of a gas present in the pipe-like member is stored in memory, and a sonic velocity value at a temperature of gas detected in the pipe-like member is computed with the use of the data of a sonic velocity value which is read from the memory in accordance with a kind of gas in the pipe-like member, thereby it is possible to calculate the length of the pipe-like member from the sonic velocity value obtained through the computation and the above-mentioned time.

16 Claims, 17 Drawing Sheets

PRIOR ART

PRIOR ART

ACOUSTIC PIPE LENGTH MEASURING APPARATUS

BACKGROUND OF THE INVENTION

Field of the Invention

The present invention relates to an acoustic pipe length measuring apparatus for measuring the length of a pipe.

Some of pipe lines such as a gas pipe line and a signal cable pipe line are used underground for a long time.

A gas pipe line as one example is composed of a branch pipe line laid underground, and feed pipe lines branched from the branch pipe line for homes or firms and each connected thereto with a gas meter in a part which is exposed from the ground.

FIG. 1 is a view which shows the positional relationship among the main branch pipe, the feed pipes and the gas meter.

In a section A where the gas pipe line is laid underground (for example, under a road), a feed pipe line 2a branches from a main branch pipe line 1, and is curved by elbows 3 or the like at several positions. Each of the elbow 3 is a joint pipe for connecting feed pipes to each other with an angle therebetween, having a small radius of curvature. In a part B of the gas pipe line which is exposed from the ground, a gas meter 4 is connected to feed pipes 2b and 2c, which is secured to, for example, the wall of a building which is not shown, and a feed pipe 2d is laid inside of the building.

If an underground gas pipe is corroded or is broken, it is required to replace or repair the gas pipe. In this case, there is used a method having the steps of digging up the ground, and repairing the exposed gas pipe, and a non-digging type inner surface repairing method in which fluid resin is externally poured into a feed pipe to be repaired, and then the pipe is subjected to a vacuum so as to harden the poured resin in order to coat the inner surface of the pipe with the resin. The latter method is advantageous in view of the cost and the preservation of law and order, and accordingly, it is desired that the development of this method is promoted. However, in this method, an excessive quantity of resin to be externally poured into the pipe blocks the pipe, but a less quantity of resin causes the coating to be insufficient. Accordingly, in such a non-digging type inner surface repairing method, the calculation of the volume of a pipe is beforehand required in order to estimate the quantity of resin to be poured into the pipe. Since the inner diameter of the pipe is already known, it is only required to measure the overall length of the feed pipe.

Conventionally, the following methods using sound waves have been known in the technical field of measuring the length of a feed pipe (refer to lecture theses of Japanese Acoustic society).

(1) Long Pipe Length Measuring System

As shown in FIG. 2, one speaker 6 and two microphones 7, 8 are coupled to one end of a long pipe 5, and an oscillator 9 is connected to the speaker 6 while an oscilloscope 10 is connected to the microphones 7, 8. In this system, a pulse-like sound wave emitted from the speaker 6, is received by the microphones 7, 8, and the wave forms of the sound waves are observed through the oscilloscope 10 so as to calculate a sonic velocity. Further, the time required for the sound wave to propagate from the front end 5a to the rear end of the long pipe 5 is obtained, and accordingly, the length of the long pipe 5 can be measured.

(2) Polyethylene Pipe Length Measuring System

As shown in FIG. 3, a speaker 12 is attached to one end of a hose-like polyethylene pipe 11, and a microphone 13 is attached to the other end of the pipe 11. The speaker 12 and the microphone 13 are connected to a measuring device 14. In this system, the length of the pipe 11 can be measured with the use of the time from the emission of a pulse-like sound wave at a several kHz by the speaker to the receipt thereof at the microphone 13 and the sonic velocity. It is noted that the speaker 12 and the microphone 13 actually make close contact with the pipe 11 although FIG. 3 shows that they are separated from the pipe 11.

In general, in the case of measuring the length of a closed pipe with the use of a sound wave with the systems (1) and (2) as mentioned above, since the sonic velocity varies in accordance with the kind, components and temperature of gas flowing through the pipe, a measuring device for measuring the length of a pipe in accordance with the time between the emission of a sound wave into the pipe and the receiving of reflected-back sound waves gives a measured value which differs under various conditions since the propagation of the sound wave varies.

Meanwhile, in the system (1), the frequency of a sound wave may be set at a value of about 1 kHz if the bore diameter of a long pipe to be measured is large and the radius of curvature of a curved part in the pipe is large. If, for example, the bore diameter of a pipe such as a feed pipe is small (25 mm), or if a joint pipe such as a tee or an elbow is present in the curved part, the reflection of a sound wave becomes large at that part, and accordingly, the distinction between the reflected wave at the rear end of the feed pipe and the reflected wave at the curved part is difficult.

Further, if the frequency of a sound wave is decreased (the wave length thereof is increased), it is likely that measurement is affected by noise, resulting in that the margin of error in measurement becomes larger.

Further, since the system (2), the speaker 12 and the microphone 13 have to be arranged respectively on both ends of the pipe 11 to be measured, the length of the pipe can hardly be measured without unearthing the pipe which is laid underground.

Further, since the measurement is actually difficult unless both ends of a pipe to be measured are near to each other to a certain degree, the measurement of, for example, a long straight pipe is substantially impossible.

SUMMARY OF THE INVENTION

The present invention has been made to solve the above-mentioned problems, and accordingly, a first object of the present invention is to precisely measure the length of a pipe without being affected by a kind and a temperature of gas in the pipe.

A second object of the present invention is to provide an acoustic pipe length measuring apparatus by which the reflection at a curved part of a pipe-like member is less, and which can offer a less margin of error in measurement.

In order to attain the above-mentioned first object, according to the present invention, an acoustic pipe length measuring apparatus is composed of a sound emitting means for emitting a pulse-like sound wave into a pipe-like member at one end of the latter, a sound collecting means for collecting, at the one end of the pipe-like member, a pulse-like sound wave reflected at the other end of the pipe-like member, a temperature detecting means for detecting a temperature in the pipe-like member, and a memory means for storing therein asonic velocity at a reference temperature of gas existing in the pipe-like member, and a control means for measuring a pipe length of the pipe-like member in accordance with a time from the emission of the pulse-like sound wave and the collection of sound, and a sonic velocity which is obtained from the temperature and the sound velocity at the reference temperature.

The acoustic pipe length measuring apparatus according to the present invention, measures the time between the emission of a pulse-like sound wave at the one end of the pipe-like member by the sound emitting means and the collection of sound reflected at the other end there of, at the one end of the pipe-like member while the temperature in the pipe-like member is detected so that the sonic velocity in gas in the pipe-like member is calculated from the thus detected temperature, and the pipe length is measured from the measured time and the sonic velocity.

In order to attain the second object of the present invention as mentioned above, an acoustic pipe length measuring apparatus is composed of a sound emitting means for emitting a pulse-like sound wave into a pipe-like member at one end thereof and a sound collecting means for collecting pulse-like waves reflected in the pipe-like member, at the one end of the pipe-like member so as to measure the time between the emission of the sound wave by the sound emitting means and the collection of reflected waves by the sound collecting means, wherein the wave-length $\lambda$ of the sound wave issued into the pipe-like member is set so as to satisfy the following expression:

$$0.257d + 0.971 < \lambda < \frac{2\pi\epsilon}{\sqrt{2n}}$$

$$\epsilon \leq v\Delta t$$

where
- d is bore diameter of pipe-like member;
- n is signal-to-noise ratio in measuring apparatus;
- v is sonic velocity (m/s) in pipe-like member;
- $\Delta t$ is sampling time (s) in the measuring apparatus; and
- $\epsilon$ is error inherent to measuring apparatus.

The acoustic pipe length measuring apparatus according to the present invention sets the upper limit of the wave lengths of sound waves emitted to the one end of the pipe-like member from the sound emitting means, to a value which is determined by the error and the signal-to-noise ratio which are inherent to the measuring apparatus, so as to decrease the margin of error in measurement of the pipe length, and sets the lower limit of the wave lengths of the pulse-like members to a value determined by the bore diameter of the pipe-like member so as to decreased the reflection in the pipe-like member.

BRIEF DESCRIPTION OF THE DRAWINGS

FIG. 17 is an explanatory view for explaining the relationship between a pipe line system having four curved part and the reflectance there of;

DETAILED DESCRIPTION OF PREFERRED EMBODIMENTS

The present invention will be explained with reference to the drawings.

Figure 1:
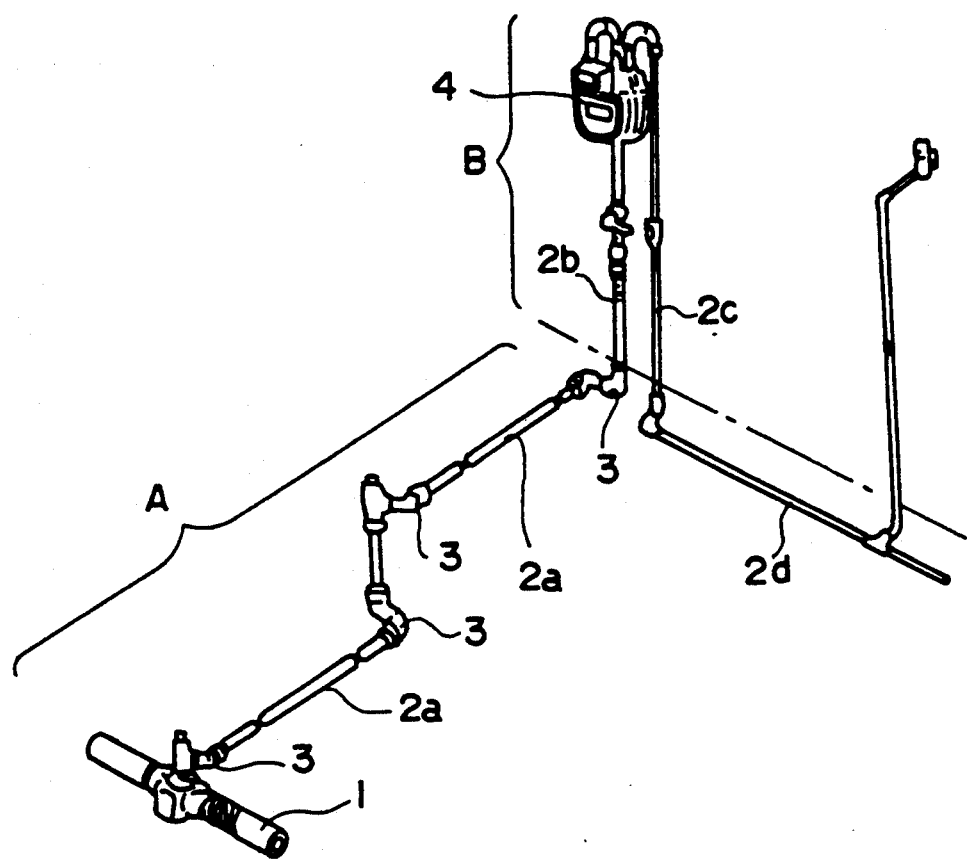
FIG. 1 is a view illustrating the relationship between a gas pipe line and a gas meter.
Figure 2:
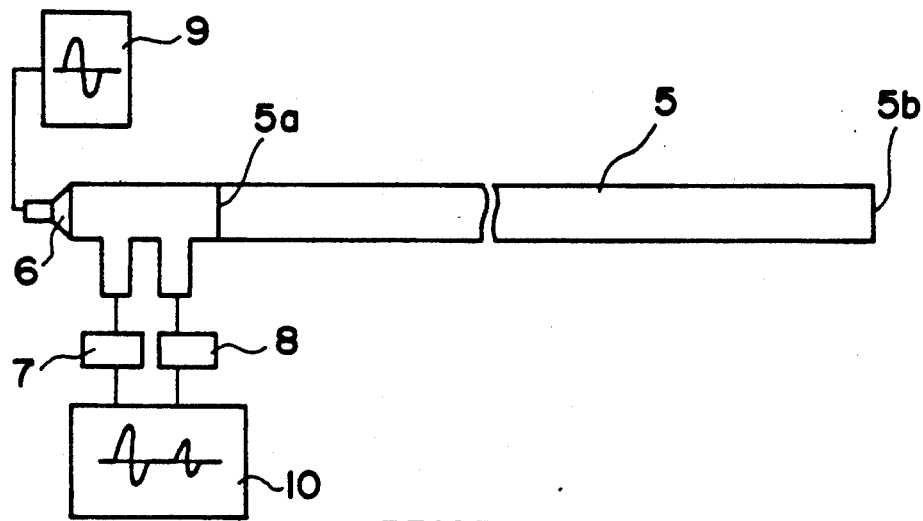
FIG. 2 is a diagram illustrating a conventional pipe length measuring system.
Figure 3:
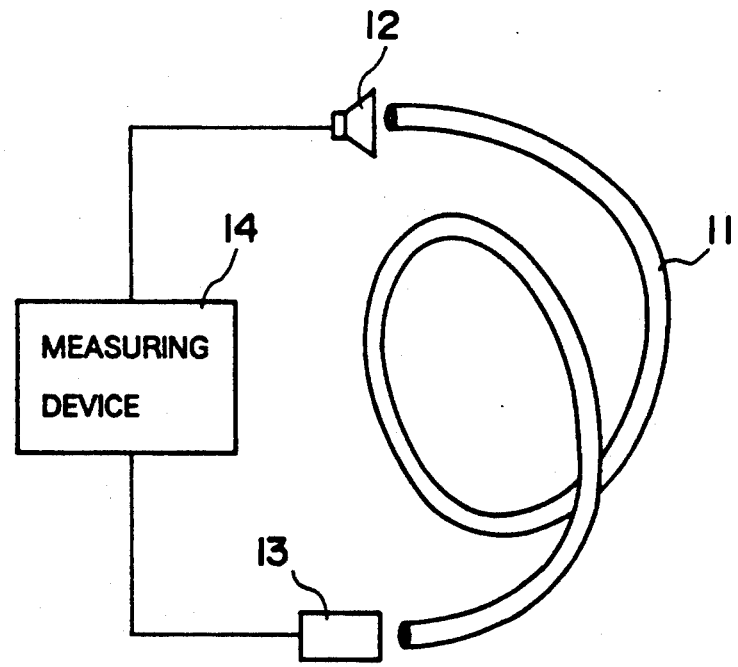
FIG. 3 is a diagram illustrating another conventional pipe length measuring system.
Figure 4:
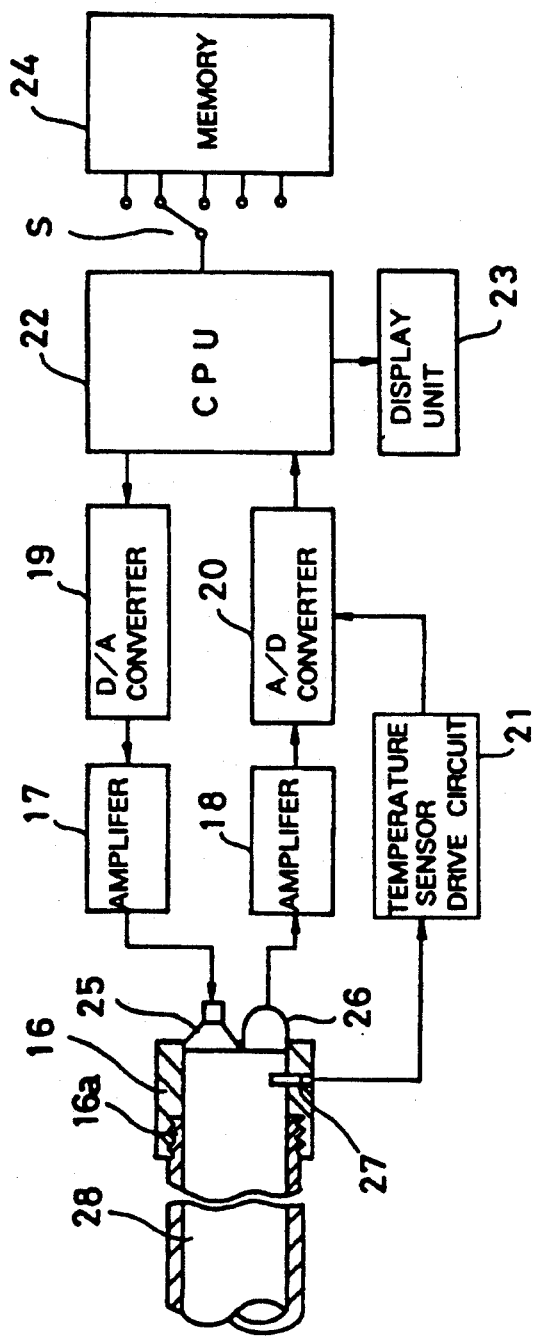
FIG. 4 is a block diagram illustrating a rough arrangement of one embodiment of an acoustic pipe length measuring apparatus according to the present invention.

FIG. 4 is a view illustrating one embodiment of a pipe length measuring apparatus according to the present invention.

As shown in the figure, the pipe length measuring apparatus is composed of a coupling member 16, amplifiers 17, 18, a D/A converter 19, an A/D converter 20, a temperature sensor drive circuit 21, a CPU 22, a display unit 23, a switch S and a memory 24. The coupling member 23 is formed of, for example, a metal pipe-like member and is adapted to be disengageably coupled to a feed pipe 28 by means of thread grooves 16a formed in the inside of one end part of the coupling member 23. A speaker 25 and a microphone 26 are fixed to the coupling member 16 in the vicinity of the other end thereof, and a temperature sensor 27 for measuring the temperature in the pipe is fixed to the pipe, piercing through the wall thereof in the vicinity of the other end of the pipe with the front end part of the temperature sensor 27 being exposed to the inside of the pipe. This coupling member 16 is formed in such a way that one end of the pipe 28 is set in a closed condition when it is fitted to the feed pipe 28. It is noted that the temperature sensor 27 and a temperature sensor driving circuit 21 constitute a temperature detecting means.

A speaker 25 emits a pulse-like sound wave into the feed pipe 28 in accordance with an instruction from the CPU 22, and a microphone 26 collects reflected sound from the feed pipe 28 and delivers an output signal which is amplified by the amplifier 18.

The A/D converter 20 converts an analog signal from the amplifier into a digital signal.

A temperature sensor 27 is composed of, for example, not only a thermistor for converting a temperature in the inside of the feed pipe 28 into a resistance value. However, it should not always to be limited to the thermistor, but a thermocouple can be also used instead thereof.

A temperature sensor drive circuit 21 converts a variation in the resistance of the temperature sensor 27 into a variation in voltage.

The memory 24 stores there in data concerning the relationship between a kind of gas (such as, natural gas, propane gas or the like) in the feed pipe 28 and a sonic velocity value at a reference temperature (for example, 0 deg.C.). The selection of data concerning a sonic velocity with respect to a kind of gas can be made by the operator who changes over the switch S, and accordingly, the length of the pipe can be measured for any of different kinds of gases. Further, the kind of gas in the feed pipe 28 may be determined by use of a gas sensor (which is not shown) so as to automatically read data of a sonic velocity corresponding to the kind of gas.

The display unit 23 is adapted to display the value of a length measured by the measuring apparatus, and may be composed of either a liquid display unit or LEDs (light emitting diodes).

The CPU 22 is composed of, for example, a microprocessor and is connected to the D/A converter 19, the A/D converter 20, a display unit 23 and the switch S. The CPU 22 delivers an instruction for emitting a pulse-like sound wave, to the D/A converter 19, and receives a reflective wave of the pulse-like sound wave which is collected at the microphone 26, from the A/D converter 20 so as to measure the time between the emission of the sound wave and the receiving thereof, and further, it receives a signal indicating a temperature inside of the feed pipe 28, from the temperature sensor drive circuit 21, and computes a sonic velocity in accordance with data of a sonic velocity value at the reference temperature which is read from the memory 24 in accordance with the kind of gas in the feed pipe 28. The CPU 22 calculates the length of the feed pipe 28 from the thus computed sonic velocity and the above-mentioned time, and the thus calculated value is displayed on the display unit 23.

Next, explanation will be made of the operation of the pipe length measuring apparatus with reference to FIGS. 5 and 6 which show a flow-chart for explaining the operation of the acoustic pipe length measuring apparatus.

Figure 5:
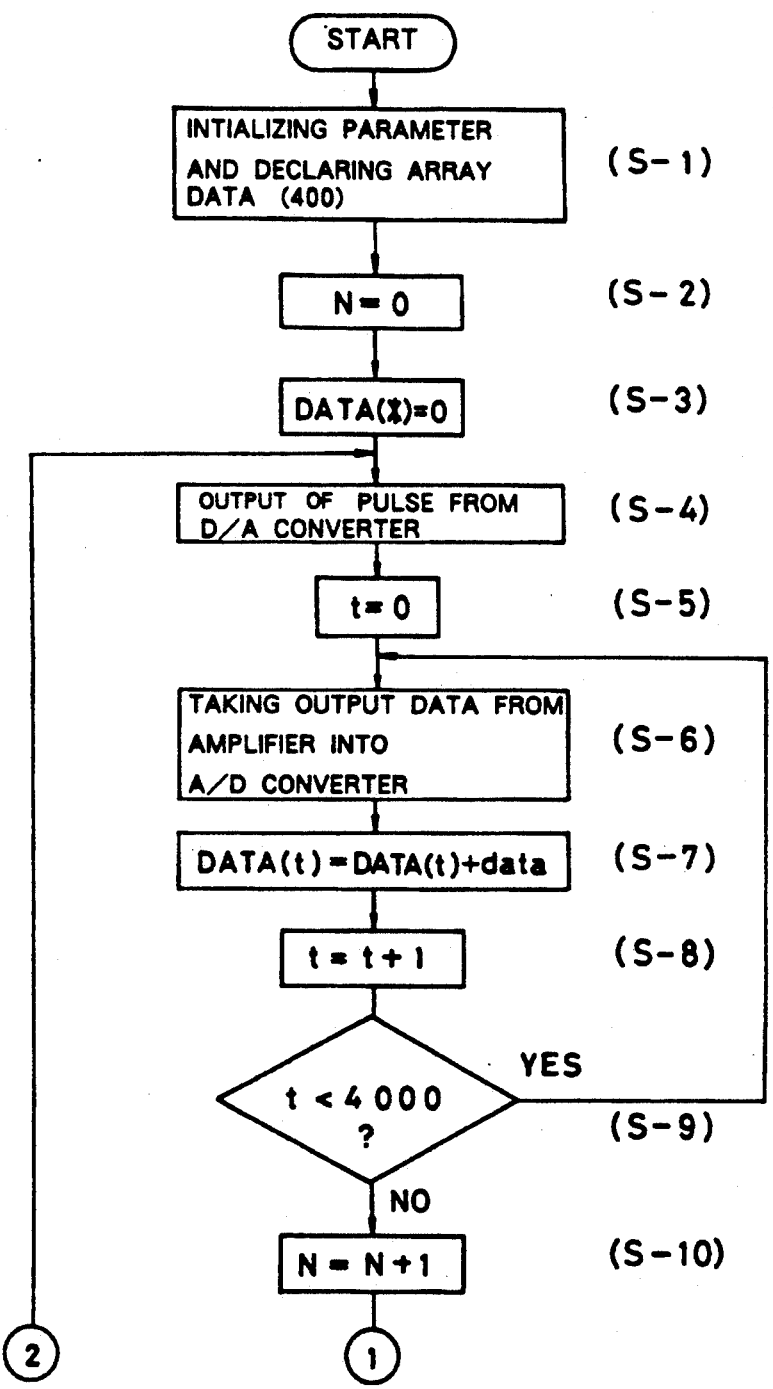
FIG. 5 is a flow-chart for explaining the operationof the pipe length measuring apparatus shown in FIG. 4.

Referring to FIG. 5, when the measurement of the length of the feed pipe 28 is started, the CPU 22 initializes several parameters, and an array "DATA (4000)" is declared. That is, "DATA (4000)" is an array having elements in a number of 4,000, in which values that are obtained by collecting soundwave signals and sampling the same at time intervals of $\Delta t(s)$ and that are taken in the memory are arranged in the order of time (step S-1).

O is substituted into a variable N which denotes a cycle number or repetitions of computation (step S-2), and O is substituted in DATA(*). This shows that all elements in the array DATA(4000) are set to 0 (step S-3).

The D/A converter 19 delivers an analog signal for emitting a pulse-like sound wave to the amplifier 17 (step S-4). As a result, the speaker 25 emits a pulse-like sound wave into the feed pipe 28 by one cycle.

O is substituted to a variable t which denotes a number of thee lements in the array (step S-5), and an output "date" from the amplifier 18 is taken into the A/D converter 20 (step S-6). This shows that the reflected wave signal (output "data") corresponding to the pulse-like sound wave which is received by the microphone 26 is taken in at the sampling intervals $\Delta t$. The value, DATA(t)+data, is substituted in evch element DATA(t) in the array "DATA(4000)" (Step S-7). The value of data is an output value from the amplifier 18 at the variable "t", and it is substituted into each array element DATA(t). A variable "t-1" is substituted into the variable t (Step S-8), and whether the value of the variable 7 is less than 4,000 or not is discriminated. If it is less than 4,000, the procedure is returned to step S-6 (step S-9). Accordingly, data in one cycle of the pulse-like sound wave is sampled. N+1 is substituted into the variable "N" (step S-10), and the procedure is advanced to the next step S-11.

Figure 6:
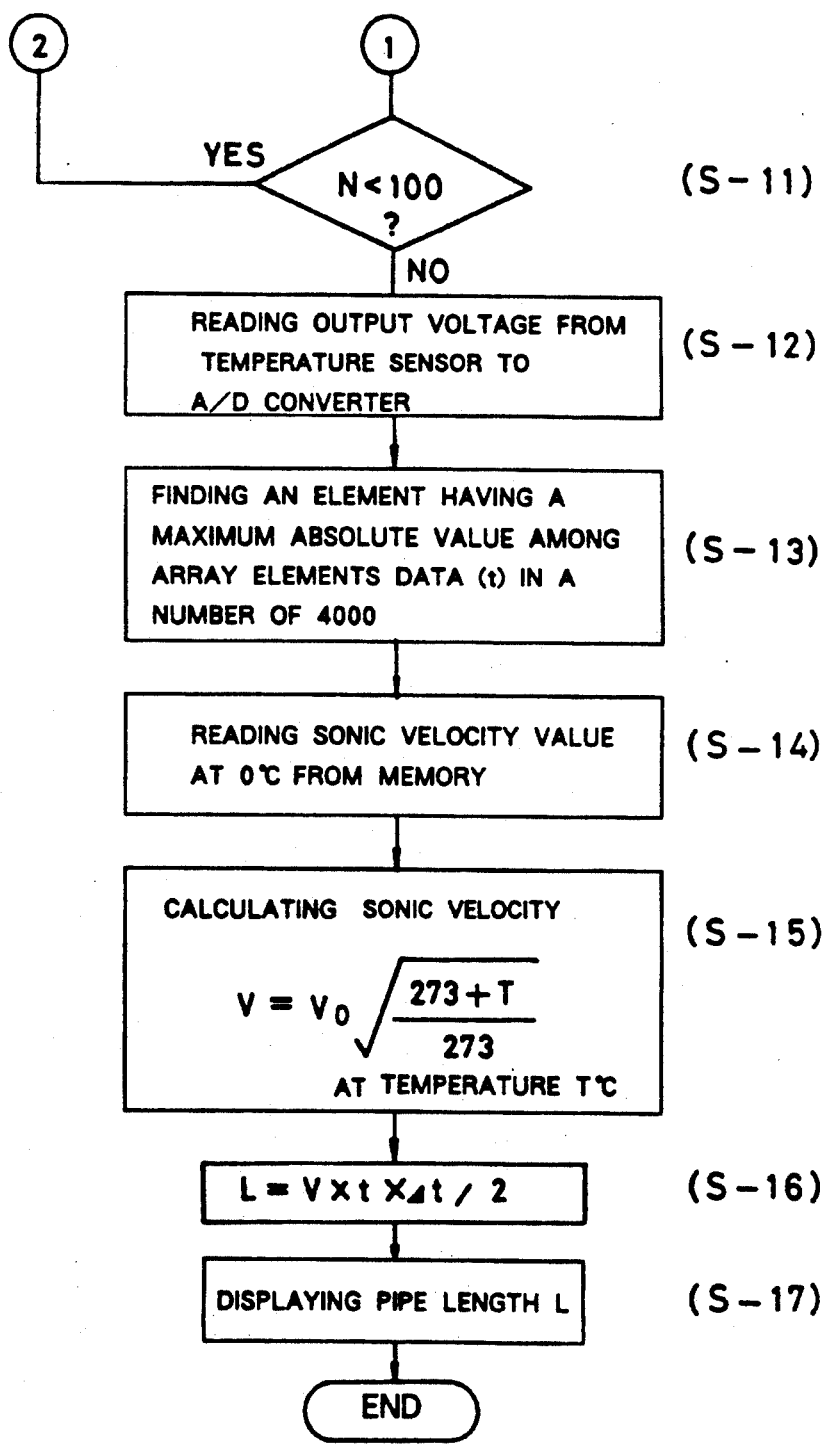
FIG. 6 is a flow-chart which is continuous to the flowchart shown in FIG. 5.

Referring to FIG. 6, whether the value of the variable "N" is less than 100 or not is discriminated, and if the variable "N" is less than 100, the computation from step S-4 to step S-10 is repeated. This computation is made for eliminating noise by performing the additive average of data in 100 cycles, that "N" exhibits the cycle number. Incidentally, if the additive averageis carried out by 100 cycles, the intensity of noiseis decreased to a value which is the square root of one to one hundred, that is one to ten. It is noted that the value of the cycle number N should not be limited only to 100.

If the variable "N" is larger than 100 at step S-11, the A/D converter 20 reads an output voltage from the temperature sensor 27 (step S-12).

The CPU 22 selects a value of t whose absolute value is maximum, among array elements DATA(t) in a number of 4,000(step S-13). With this element, ther57 amplitude of the reflected wave at the open end of the feed pipe 28 is maximum, and the maximum value thereof is used. It is noted here that the waveform of the reflected wave theoretically contains positive and negative components having symmetrical shapes, and accordingly, two maximum values are present. However, in practical, when the speaker 25 emits a sound wave, one of the diaphragm surfaces of the speaker 25, for example, the surface corresponding to the positive component weakly vibrates while the other of the surface corresponding to the negative component strongly vibrates so that the reflected wave has an asymmetrical shape.

As a result, the peak value of the amplitude of the negative component (second one) is selected.

A sonic velocity value vo (m/s) at a temperature of 0° C. of a gas inside of the feed pipe 28 is read from the memory 22 (step S-14). It is noted that a sonic velocity value at 0° C. corresponding to a kind of gas in the feed pipe 28 can be obtained by the operator who changes over the switch S as mentioned above.

With the use of a temperature T° C. which is obtained through the temperature sensor 27 and the temperature sensor drive circuit 21, a sonic velocity v(m/s) in the gas present in the feed pipe 28 is computed by using the following equation 1 (step S-15):

$$v = vo\{1 + T/273\}^{\frac{1}{2}} \quad (1)$$

Then, the length L (m) of the feed pipe 28 is calculated by using the following equation 2 (step S-16):

$$L = v \cdot t \cdot \Delta t / 2 \quad (2)$$

The value of thus calculated length L of the feed pipe 28 is displayed on the display unit 23 (step S-17).

As detailed above, according to the present embodiment, with the detected temperature of the gas in the feed pipe 28, the sonic velocity value at that temperature is computed, and then, with the use of the thus computed sonic velocity value, the length of the feed pipe can be precisely measured, irrespective of a temperature and a kind of gas in the feed pipe 28.

Figure 7:
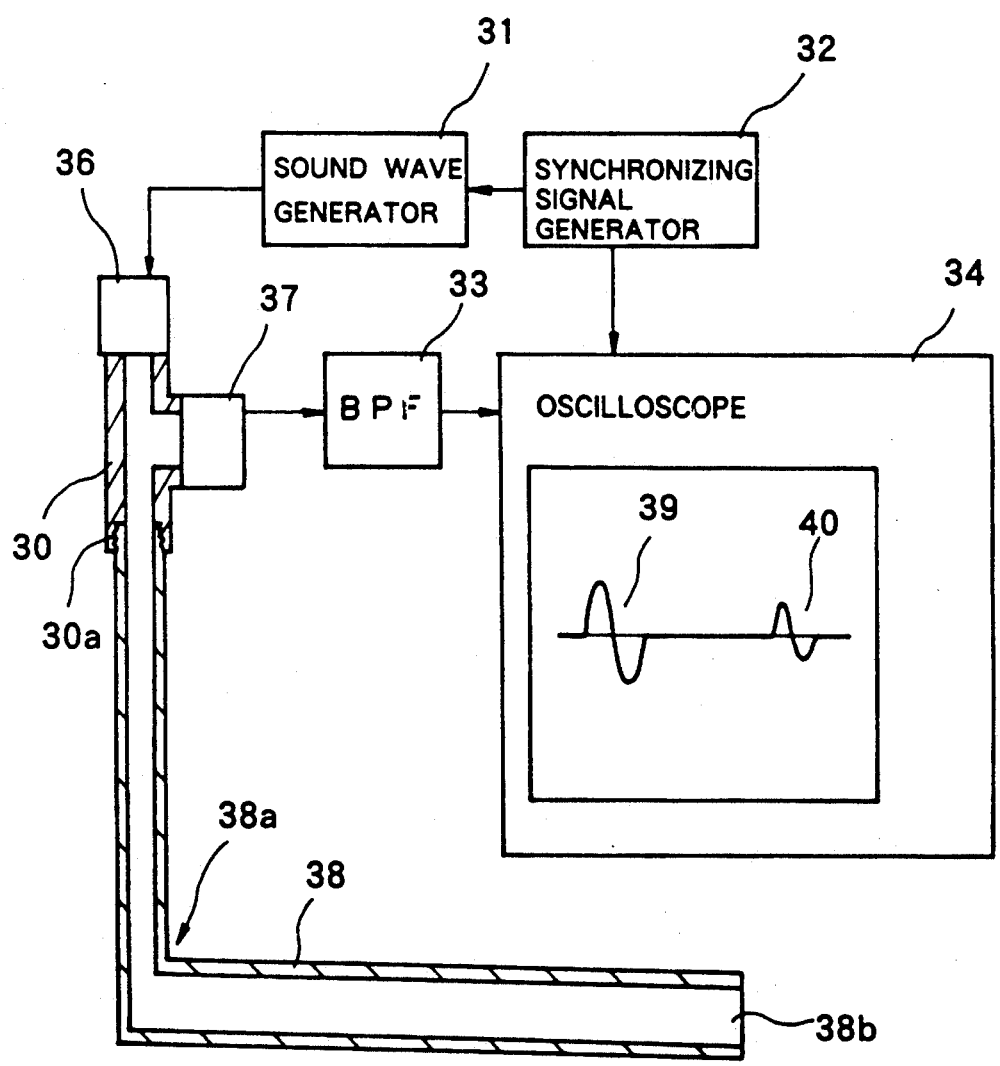
FIG. 7 is a view illustrating a rough arrangement of another embodiment of the acoustic pipe length measuring apparatus according to the present invention.

Next, explanation will be made of a second embodiment of the present invention with reference to FIG. 7.

In this embodiment, the length of a pipe having a curved part is measured. An acoustic pipe length measuring apparatus in this embodiment is composed of a coupling member 30, a sound wave generator 31, a synchronizing signal generator 32, a band pass filter 22 and an oscilloscope 34. A speaker 36 and a microphone 37 are coupled to the coupling member 30. The sound generator 31 and the speaker 36 constitute a sound emitting means, and a microphone 37 and the band pass filter 33 constitute a sound collecting means.

The coupling member 30 is formed of, for example, a metal cylindrical member, and is formed in the lower end part thereof with thread grooves 30a through which the coupling member 30 is connected to a thread groove part formed in the upper end part of a pipe 38. With the use of the coupling member 30, the speaker 36 and the microphone 37 are removably coupled to the pipe 38 so that it is possible to enhance the working efficiency. Although the speaker 36 is arranged perpendicularly to the microphone in this figure, the present invention should not be limited to this arrangement. That is, they may be arranged in parallel with each other. Further, since the speaker 36 and the microphone 37 are arranged adjacent to each other, the measuring apparatus can be miniaturized. The synchronizing signal generator 32 delivers a synchronizing signal to the sound wave generator 31 and the oscilloscope 34, and accordingly, the relationship between the time from the emission of a sound wave to the collection of sound and the amplitude of the sound wave can be visually grasped.

The sound wave generator 21 emits a pulse-like sound wave, in one cycle, which is selected among those in a frequency range of 100 Hz to 4 kHz, when the synchronizing signal is delivered thereto, and drives the speaker 36. It is noted that the above-mentioned frequency range of 100 Hz to 4 kHz satisfies an equation (15) which will be here in below explained. Since the frequency (wave length) of an emitted sound wave is variable, the length of a sound wave can be selected in accordance with the bore diameter of the pipe 38.

A sound wave collected at the microphone 37 is converted into an electric signal. The band pass filter 33 allows only signals having a frequency in the range of 100 Hz to 4 kHz to pass there through, and accordingly, noise can be removed.

The oscilloscope 34 displays thereon both wave form 29 of a sound wave emitted from the speaker 36 and wave form 28 of a sound wave reflected in the pipe 38, simultaneously, so that the observation is facilitated.

Next, explanation will be made of the operation with reference to FIGS. 7 and 8.

When a signal from the synchronizing signal generator 32 is delivered to the sound wave generator 31, the sound generator 31 applies a sound wave signal in one cycle to the speaker 36. As a result, the pulse-like sound wave in one cycle is emitted from the speaker 36. The thus emitted sound wave propagates through the pipe 38, and then a part of the sound wave is reflected at a curved part 38a, and the remaining part thereof further propagates through the pipe 38 in an attenuated condition. The propagating sound wave is totally reflected at the open end of the pipe 38, and then propagates in the reverse direction in the same path so as to be collected at the microphone 37. The reflected waves collected by the microphone 37 are converted into electric signals and led to the band pass filter 33 where noise is removed. Thus, wave forms as shown in FIG. 8 are observed on the screen of the oscilloscope 34.

Figure 8:
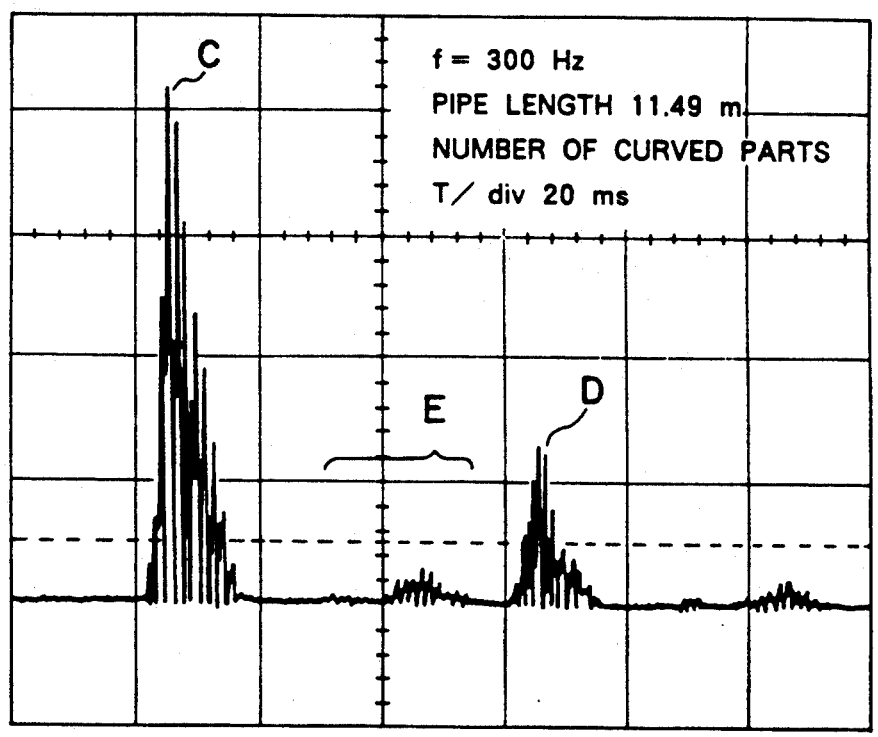
FIG. 8 is a view illustrating wave forms observed on an oscilloscope.

An example shown in FIG. 8 is in such a case that the frequency of the sound wave is 300 Hz, the length of the pipe is 11.49 m, the pipe having a number of 10 of curved parts. Incidentally, the time axis is given by div. 20 ms. An emitted sound wave C (left of the figure) and a sound wave D (center of the figure) which is reflected at the open end of the pipe are displayed on the oscilloscope 34, and since the time difference between the wave form of the generated sound wave and the first reflected wave is about 80 ms, the length of the feed pipe is obtained by dividing the product of this time difference and the sound velocity with 2. It is noted that the one of reflected waves which is reflected at the open end is the totally reflected one, and accordingly, has an amplitude which is larger than a reflected wave E at a curved part.

Figure 9:
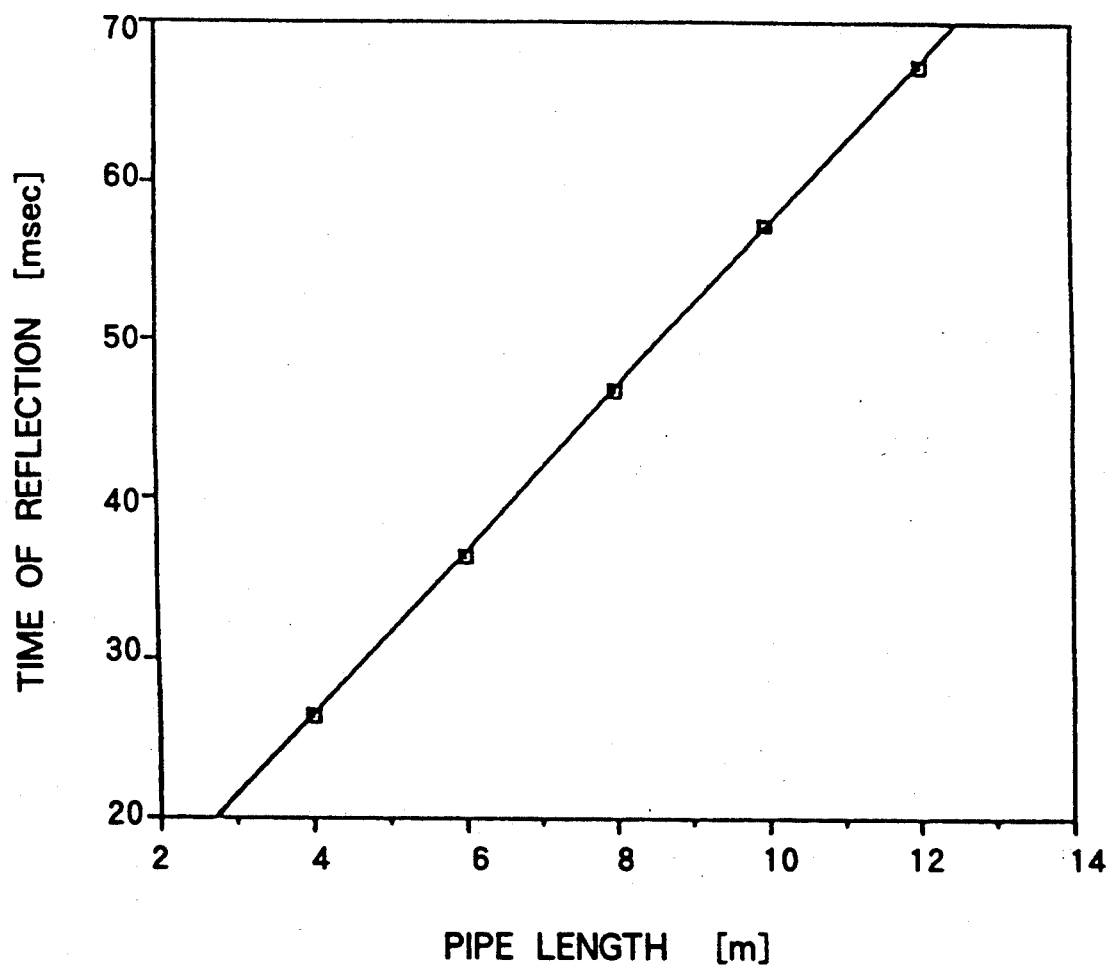
FIG.9 is a graph showing the relationship between the pipe length of a pipe and the time of reflection.

FIG. 9 is a graph showing the relationship between the length of the pipe and the time of reflection.

As shown in the figure, it is found that the relationship between the pipe length and the time of reflection is linear. Accordingly, the length of the feed pipe can be known from the time of reflection.

Figure 10:
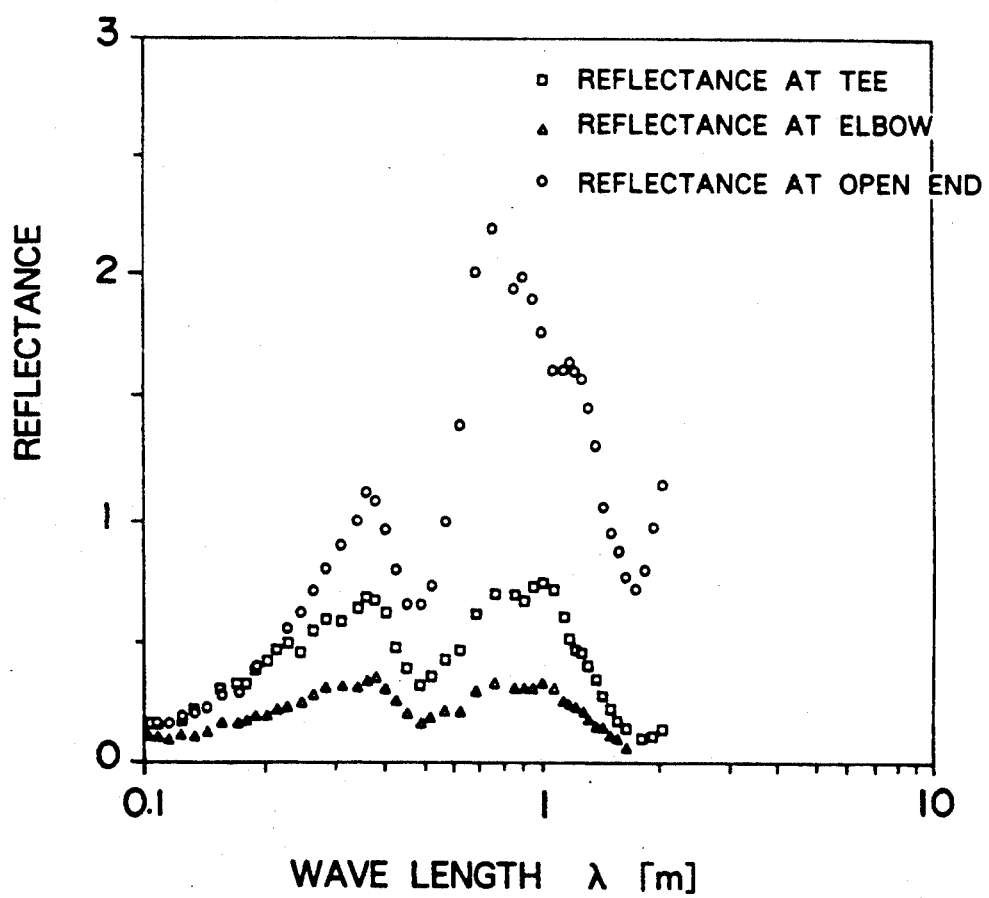
FIG. 10 is a graph showing the relationship between the wave length of a sound wave and the reflectance of a pipe having a bore diameter of 25 mm.
Figure 11:
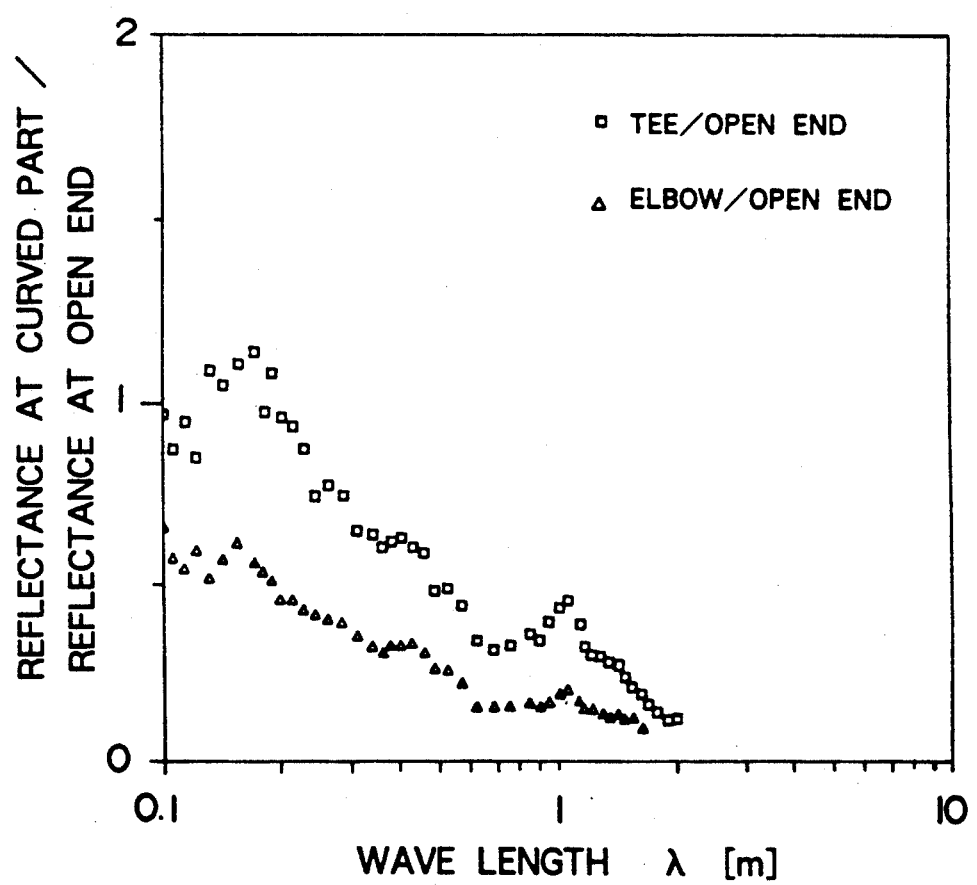
FIG. 11 is a graph showing the relationship between the wave length of a sound wave and a value which is obtained by dividing a reflectance at a curved part of a pipe having bore diameter of 25 mm with a reflectance at an opened end thereof.

With the use of the pipe length measuring apparatus according to the present invention, reflectance at curved parts in pipes having difference bore diameters, were measured so as to obtain the results shown in FIGS. 10 and 11.

Figure 12:
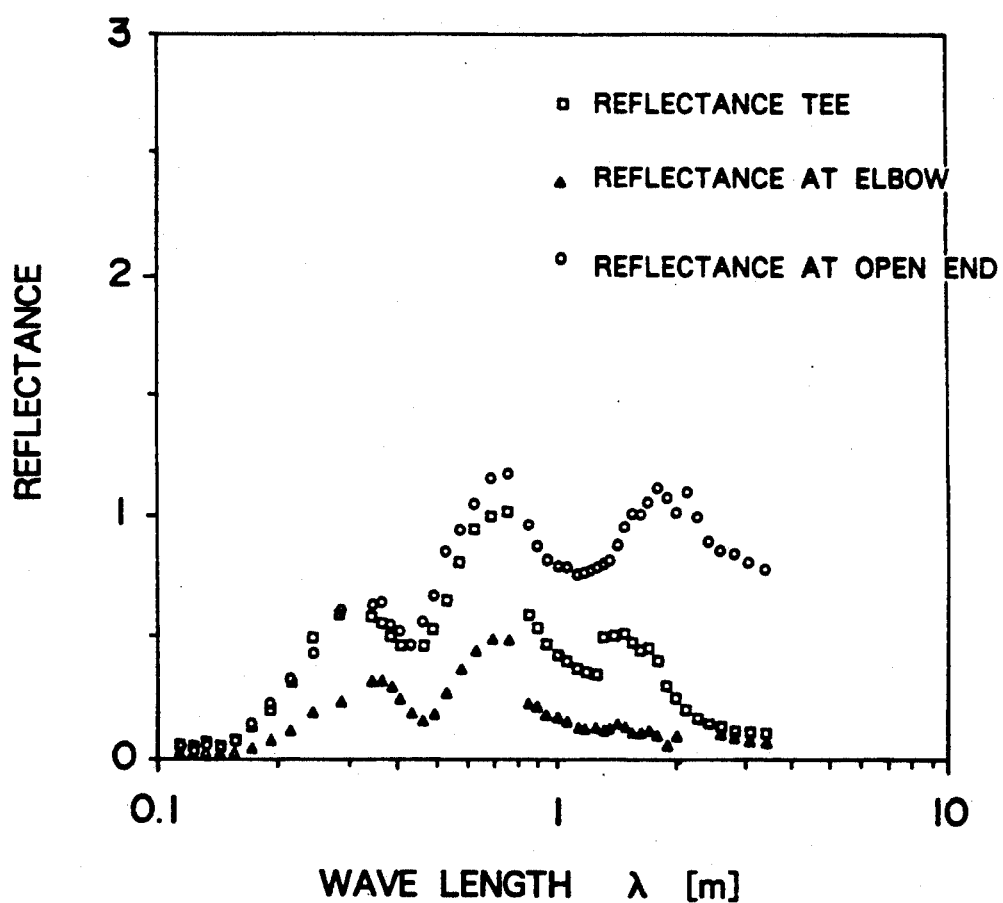
FIG. 12 is a graph showing the relationship between the wave length of a sound wave and the reflectance of a pipe having a bore diameter of 50 mm.
Figure 13:
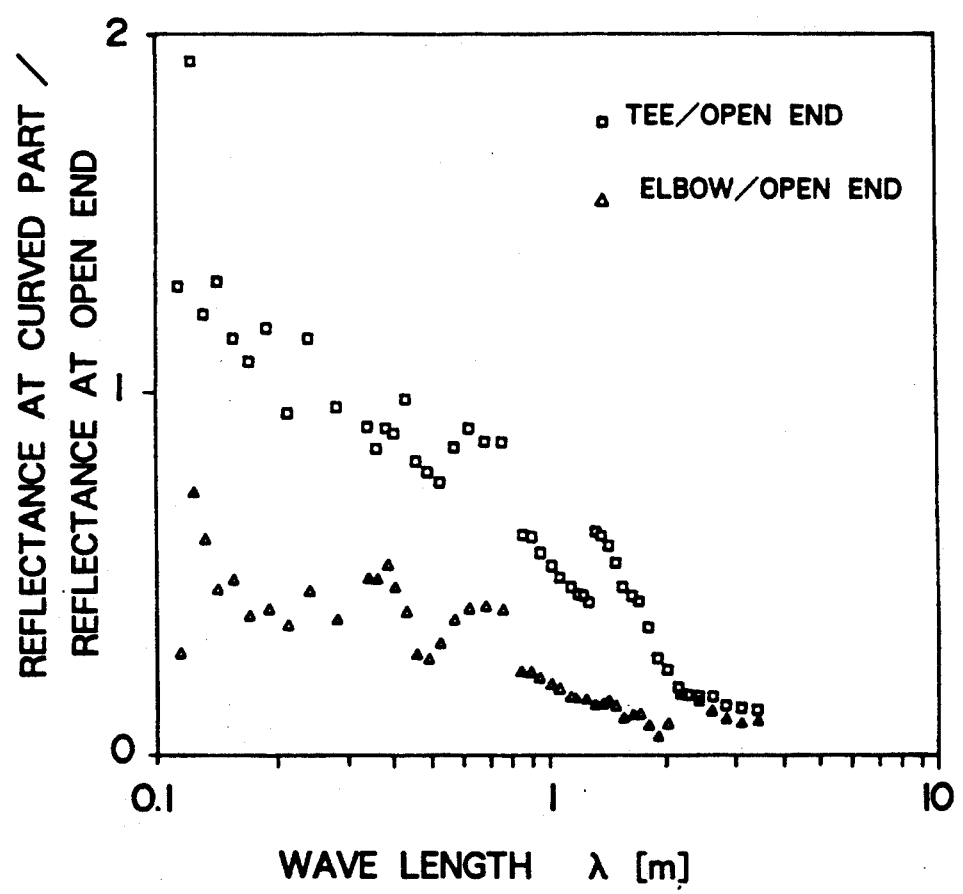
FIG. 13 is a graph showing the relationship between the wave length of a sound wave and a value which is obtained by dividing a reflectance at a curved part of a pipe having a bore diameter of 50 mm with a reflectance at an open end thereof.
Figure 14:
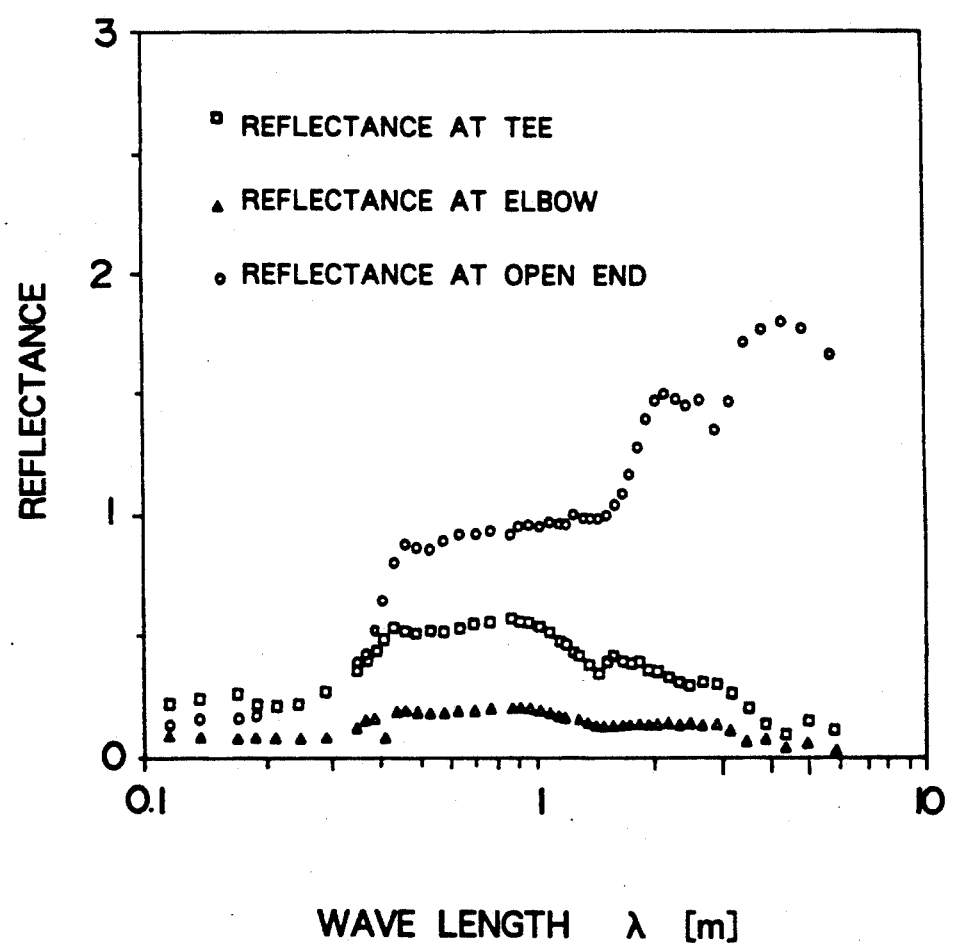
FIG. 14 is a graph showing the relationship between the wave length of a sound wave and the reflectance of a pipe having a bore diameter of 80 mm.
Figure 15:
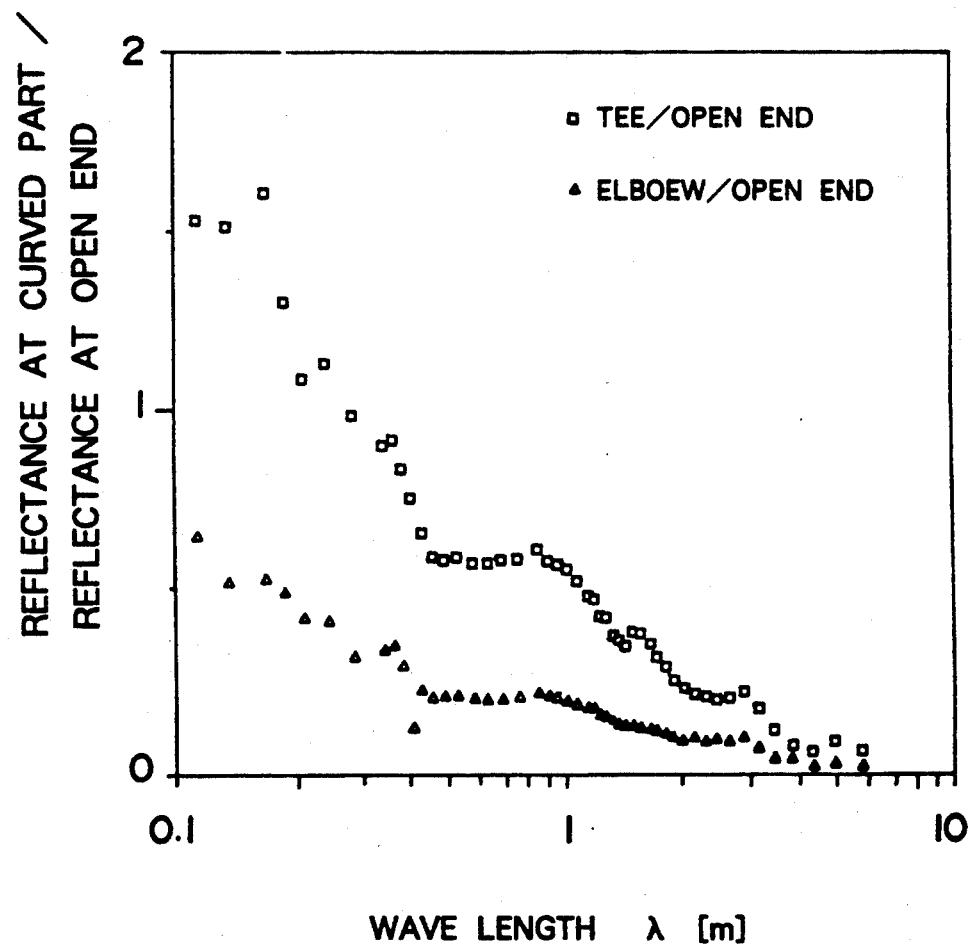
FIG. 15 is a graph showing the relationship between the wave length of a sound wave and a value which is obtained by dividing a reflectance at a curved part of a pipe having adiameter of 80 mm with a reflectance at an open end thereof.
Figure 16:
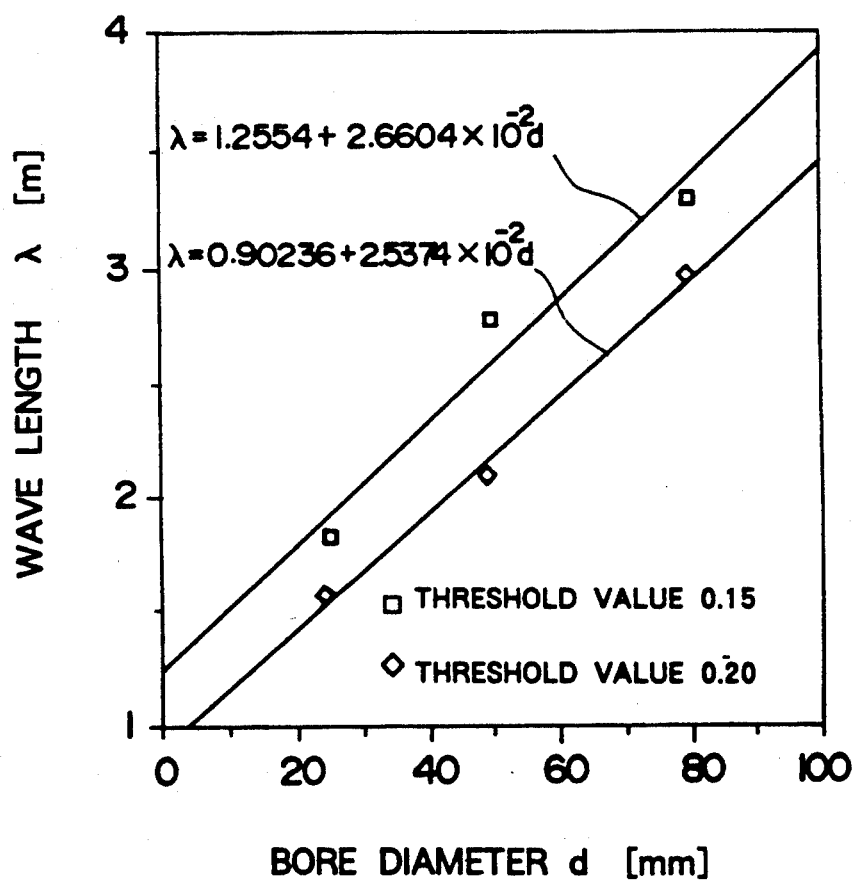
FIG. 16 is a graph showing the relationship between the bore diameter of a pipe and a minimum wavelength of a sound wave.

FIGS. 10, 12 and 14 are graphs illustrating the relationship between the wave length of a sound wave and a reflectance at a curved part, and FIGS. 11, 13 and 15 are graphs illustrating the relationship between the wave length of a sound wave and a value which is obtained by dividing a reflectance at a curved part with a reflectance at the open end. The graphs shown in FIGS. 11, 13 and 15 are used for purely examining the reflectance of a sound wave at a curved part in consideration with the attenuation in straight parts of the pipe. The bore diameter of a pipe relating to FIGS. 10 and 11 is 25 mm, and that relating to FIGS. 12 and 14 is 80 mm. In any one of the graphs, the wave length axis (abscissa) is logarithmic. Further, the tee joint is a T-like or L-like shape joint pipe for connecting pipes with each other. As clearly understood from these figures, the reflectance at a tee join is larger than that at an elbow. Accordingly, the condition for the reflectance can be considered only for the tee joint.

From FIGS. 11, 13 and 15, it is found such a trend that the longer the wave length, the less the reflectance at the curved part becomes, and the shorter the wave length, the larger the reflection at the curved part becomes.

Meanwhile, it has been known that the longer the wave length, the larger the margin of error in measurement becomes while the shorter the wave length, the smaller the margin of error in measurement becomes. Thus, according to the present invention, it is possible to determine an available wave length range from these two factors (the wave length and the margin of error in measurement).

(1) Lower Limit of the Wave Length

Figure 17:
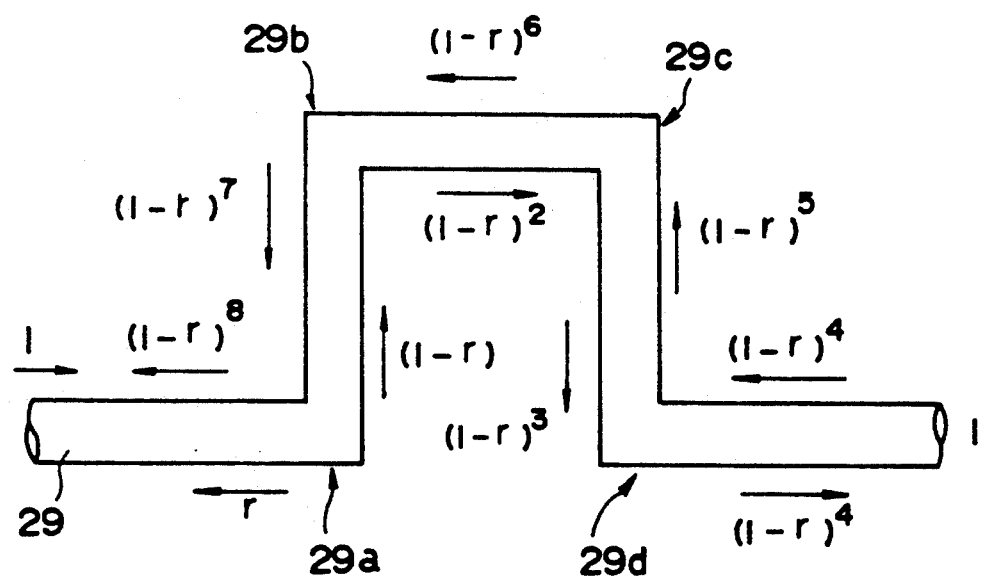

As shown in FIG. 17, consideration will be made of reflection of a sound wave in a pipe line system having four curved parts which are tee joints.

An estimation is made such that a sound wave emitted on the left side of the pipe 29 is partly reflected and attenuated at four curved parts 29a through 29d, is then reflected totally at the open end on the right side, and is finally propagated in the reverse direction in the same path. Of the reflected waves collected on the left side, the one having a maximum amplitude is a reflected wave at the open end. Denoting the reflectance at a first curved part 29a as r, when the reflectance of the sound wave at the open end is to be obtained, the sound wave apparently passes through eight curved parts during going and returning since there are four curved parts. Accordingly, the reflectance of the sound wave reflected at the open end is given by:

$$(1-r)^{2 \times 4} \qquad (3)$$

The intensity of the sound wave is decreased each time it passes through a curved part, and since the sound wave reflected at the open end has a reflectance of 1, the relationship between the reflectance and:

$$(1-r)^{2 \times 4} \qquad (4)$$

is given by:

$$r < (1-r)^{2 \times 4} \qquad (5)$$

By solving this equation, it is given:

$$r < 0.19. \qquad (6)$$

Thus the values of wave lengths with which the reflectance becomes 0.19 for the respective diameters, are obtained as listed in the following table:

| Bore Diameter d (cm) | 2.5 | 5.0 | 8.0 |
|---|---|---|---|
| Wave Length λ (m) | 1.62 | 2.24 | 3.03 |

Figure 18:
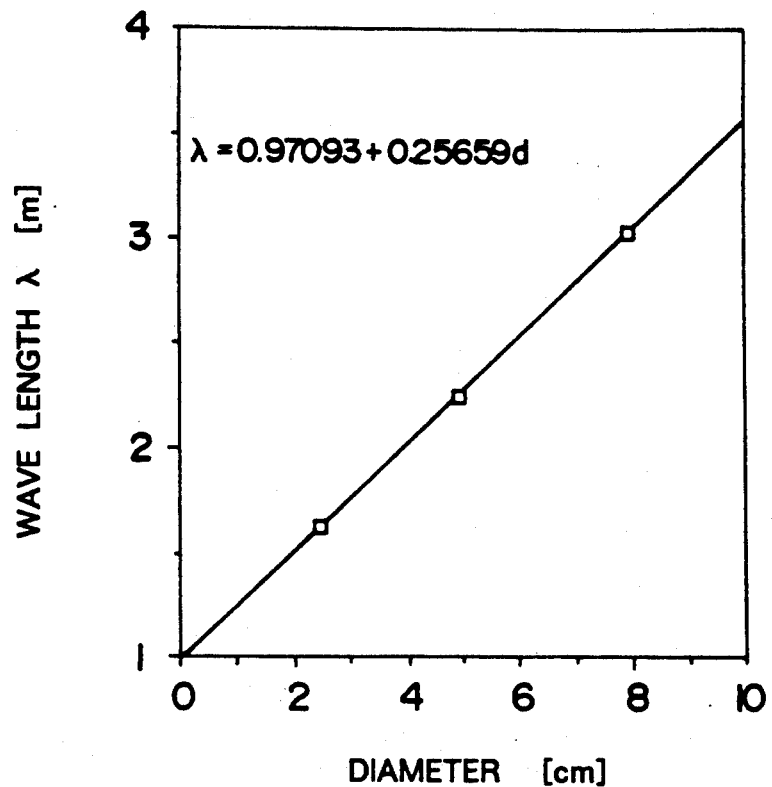
FIG. 18 is a graph showing the relationship between the bore diameter of a pipe and the wave length of a sound wave.

With the use of numerical values in this table, the equation for a straight line is obtained through the minimum square approximation, as shown in FIG. 18.

FIG. 18 is a graph showing the relationship between the bore diameter of a pipe and the wave length of a sound wave. In this figure, the horizontal axis gives the bore diameter d and the vertical axis gives the wave length λ.

The coefficient of correlation of the equation shown in the figure is 1.0. From this figure, the relationship between the wave length λ and the bore diameter is approximated by:

$$\lambda = 0.257d + 0.971 \qquad (7)$$

This equation exhibits the relationship between the wave length λ and the bore diameter d when the reflectance is 0.19. Since it is considered that the reflectance is smaller than 0.19 if the wave length λ becomes longer, the wave length λ is:

$$\lambda > 0.257d + 0.971 \qquad (8)$$

Thus, the lower limit of the wave length λ is $0.257d + 0.971$.

(2) Upper Limit of the Wave Length

By denoting the sampling time by which reflected waves collected at the microphone, and if the sonic velocity is v and sampling time is $\Delta t$, respectively, the margin of error $\epsilon$ in measurement, inherent to the measuring apparatus is in the relationship:

$$\epsilon \leq v \Delta t \qquad (9)$$

Accordingly, in order to determine the upper limit, the maximum value $v \Delta t$ of the error $\epsilon$ in measurement is used.

Figure 19:
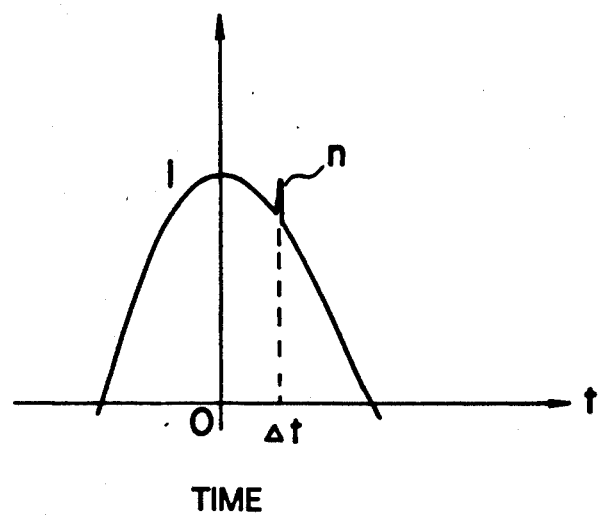
FIG. 19 is view illustrating a condition in which are reflected wave is superposed with noise.

FIG. 19 is a view for explaining a condition in which a reflected wave is superposed with noise, in which the horizontal gives time t and the vertical gives reflectance. Even though the reflected wave is superposed with noise having an S/N ratio (signal-to-noise ratio) which is 1/n, it is satisfactory for detecting the maximum value of amplitude if the following condition can be met:

$$1 - \cos \omega \Delta t > n \qquad (10)$$

Actually, since $\omega \Delta t < < 1$ in this case, by using Maclaurin's Expansion, the following equation is obtained:

$$1 - \cos \omega \Delta t = \tfrac{1}{2}(\omega \Delta t)^2 \qquad (11)$$

Further, since:

$$\omega \Delta t = 2\pi f \Delta t = 2\pi v \Delta t / \lambda = 2\pi \omega / \lambda \qquad (12)$$

the expression 1 can be exhibited by:

$$1/2 \, (2\pi \omega / \lambda)^2 > n \qquad (13)$$

$$\therefore \lambda < \frac{2\pi \epsilon}{\sqrt{2n}} \qquad (14)$$

Thus, the upper limit of the wave length is determined.

By synthesizing the contents of the above-mentioned paragraphs (1) and (2), the following upper and lower limits are determined for the wave length (in meters "m") of sound waves:

$$0.257d + 0.971 < \lambda < \frac{2\pi\epsilon}{\sqrt{\frac{1}{2n}}} \; (m) \quad (15)$$

By emitting wave having a wave length in a range given by the above-mentioned expression (15), the length of a pipe can be measured in such a condition that a reflectance at a curved part of the pipe is small and the margin of error is small. It goes without saying that the underground pipe can be measured as it is without digging the same.

Further, in such a case that a pipe is seriously damaged or corroded, a sound wave is totally reflected at that part, similar to the open end, the distance between a position where the coupling member is connected and the position of the damaged part can be measured, thereby it is possible to promote a rapid pipe repairing work.

According to the present invention, with the use of an acoustic pipe length measuring apparatus comprising a sound emitting means for emitting a pulse-like soundwave into a pipe-like member from one end of the latter and a sound collecting means for collecting a pulse-like sound wave reflected in the pipe-like member at one end thereof, for measuring the length of the pipe-like member in accordance with the time between the emission of the sound wave by the sound emitting means and the collection of reflected waves, the wave length$\lambda$ of the sound wave emitted into the pipe-like wave is set so as to satisfy the following expression:

$$0.257d + 0.971 < \lambda < \frac{2\pi\epsilon}{\sqrt{\frac{1}{2n}}} \; (m) \quad (16)$$

$$\epsilon \leq v\Delta t \quad (17)$$

where
d is bore diameter of pipe-like member,
n is signal-to-noise ratio in measuring apparatus,
v is sonic velocity (m/s) in pipe-like member,
$\Delta t$ is sampling time in measuring apparatus, and
$\epsilon$ is margin of error in measurement, inherent to measuring apparatus, thereby it is possible to measure the length of a pipe with a less margin of error.

What is claimed is:

1. An acoustic pipe length measuring apparatus comprising:
   a sound emitting means for emitting a pulse-like sound wave in a pipe-like member having a length at one end of the latter;
   a sound collecting means for collecting, at the one end of said pipe-like member, sound waves reflected at another end of said pipe-like member;
   a temperature detecting means for detecting a temperature in said pipe-like member;
   a memory means for storing a sonic velocity value at a reference temperature for a plurality of gases which may be present in said pipe-like member;
   means for selecting a sonic velocity reference value for the gas which is present in said pipe-like member; and
   a calculating means for calculating the length of said pipe-like member from a time between emission of said pulse-like sound waves and collection of the sound waves and a sonic velocity value which has been selected.

2. An acoustic pipe length measuring apparatus as set forth in claim 1, wherein said memory means stores several sonic velocity values one of which can be selected in accordance with a kind of gas present in said pipe-like member.

3. An acoustic pipe length measuring apparatus as set forth in claim 2, wherein a gas sensor for determining a kind of gas present in said pipe-like member is provided.

4. An acoustic pipe length measuring apparatus as set forth in claim 1, wherein a display unit for indicating the length to the pipe-like member obtained by said calculating means is provided.

5. An acoustic pipe length measuring apparatus as set forth in claim 1, where said reference temperature is 0° C.

6. An acoustic pipe length measuring apparatus as set forth in claim 1, wherein the sound wave emitted into said pipe-like member has a wave length$\lambda$ which is set to satisfy the following expression:

$$0.257d + 0.971 < \lambda < \frac{2\pi\epsilon}{\sqrt{\frac{1}{2n}}}$$

$$\epsilon \leq v\Delta t$$

where
d is bore diameter of pipe-like member,
n is signal-to-noise ratio in measuring apparatus,
v is sonic velocity (m/s) in pipe-like member,
$\Delta t$ is sampling time in measuring apparatus, and
$\epsilon$ is margin of error in measurement, inherent to measuring apparatus.

7. An acoustic pipe length measuring apparatus as set forth in claim 1, wherein the pulse-like sound wave emitted from said sound emitting means has a wave length which is variable.

8. An acoustic pipe length measuring apparatus comprising:
   a sound emitting means for emitting a pulse-like sound wave in a pipe-like member having a length at one end of the latter, said sound wave having a wave length $\lambda$ which is set to satisfy the following expression:

$$0.257d + 0.971 < \lambda < \frac{2\pi\epsilon}{\sqrt{\frac{1}{2n}}}$$

$$\epsilon \leq v\Delta t$$

where
d is bore diameter of pipe-like member,
n is signal-to-noise ratio in measuring apparatus,
v is sonic velocity (m/s) in pipe-like member,
$\Delta t$ is sampling time in measuring apparatus, and
$\epsilon$ is margin of error in measurement, inherent to measuring apparatus;
   a sound collecting means for collecting, at the one end of said pipe-like member, sound waves reflected at another end of said pipe-like member;
   a temperature detecting means for detecting a temperature in said pipe-like member;
   a memory means for storing a sonic velocity value at a reference temperature of a gas present in said pipe-like member; and
   a calculating means for calculating the length of said pipe-like member from the time between emission of said pulse-like sound wave and collection of the sound waves and a sonic velocity value which is obtained from said memory means.

9. An acoustic pipe length measuring apparatus comprising:
a sound emitting means for emitting a pulse-like sound wave in a pipe-like member having a length at one end of the latter, said pulse-like sound wave having a wave length which is variable;
a sound collecting means for collecting, at the one end of said pipe-like member, sound waves reflected at another end of said pipe-like member;
a temperature detecting means for detecting a temperature in said pipe-like member;
a memory means for storing a sonic velocity value at a reference temperature of a gas present in said pipe-like member; and
a calculating means for calculating the length of said pipe-like member from the time between emission of said pulse-like sound wave and collection of the sound waves and a sonic velocity value which is obtained from said sonic velocity value at said reference temperature.

10. Apparatus for measuring the length of a pipe-like member comprising:
sound emitting means adapted to be located at one end of the pipe-like member for emitting a pulse-like sound wave in the pipe-like member;
sound collecting means for collecting, at the one end of said pipe-like member, sound waves reflected at another end of said pipe-like member;
temperature detecting means for detecting a temperature in said pipe-like member;
memory means for storing a sonic velocity value at a reference temperature of a gas present in said pipe-like member, said gas chosen from the group consisting of methane, butane, propane, acetylene, natural gas, petroleum gas, and oil shale gas; and
calculating means for calculating the length of said pipe-like member from the time between emission of said pulse-like member from the time between emission of said pulse-like sound wave and collection of the sound waves and a sonic velocity value at said reference temperature.

11. Apparatus for measuring the length of a pipe-like member comprising:
sound emitting means adapted to be located at one end of the pipe-like member for emitting a pulse-like sound wave in the pipe-like member;
sound collecting means for collecting, at the one end of said pipe-like member, sound waves reflected at another end of said pipe-like member;
means closing the one end of the pipe-like member and operatively coupling the sound emitting means and the sound collecting means with an interior of the pipe-like member;
temperature detecting means for detecting a temperature in said pipe-like member;
memory means for storing a sonic velocity value at a reference temperature of a gas present in said pipe-like member; and
calculating means for calculating the length of said pipe-like member from a time between emission of said pulse-like sound waves and collection of the sound waves and a sonic velocity value which is obtained from said memory means.

12. Apparatus for measuring the length of a pipe-like member comprising:
sound emitting means adapted to be located at one end of the pipe-like member for emitting a pulse-like sound wave in the pipe-like member;
sound collecting means for collecting, at the one end of said pipe-like member, sound waves reflected at another end of said pipe-like member;
temperature detecting means for detecting a temperature in said pipe-like member;
means for closing the one end of the pipe-like member and operatively coupling the temperature detecting means with an interior of the pipe-like member;
memory means for storing a sonic velocity value at a reference temperature of a gas present in said pipe-like member; and
calculating means for calculating the length of said pipe-like member from a time between emission of said pulse-like sound wave and collection of the sound waves and a sonic velocity value which is obtained from said sonic velocity value at said reference temperature.

13. Apparatus for measuring the length of a pipe-like member comprising:
sound emitting means adapted to be located at one end of the pipe-like member for emitting a pulse-like sound wave in the pipe-like member;
sound collecting means for collecting, at the one end of said pipe-like member, sound waves reflected at another end of said pipe-like member;
temperature detecting means for detecting a temperature in said pipe-like member;
memory means for storing sonic velocity values at a reference temperature for a plurality of gases which may be present in said pipe-like member;
means for selecting a wave length for sound to be emitted by the sound emitting means as a function of at least one of the pipe-like member the length of which is to be measured and the gas which is present in said pipe-like member; and
calculating means for calculating the length of said pipe-like member from a time between emission of said pulse-like sound wave and collection of the sound wave on the basis of said sonic velocity value for the gas which is present in said pipe-like member.

14. Apparatus for measuring the length of a pipe-like member comprising:
a sound emitting means adapted to be located at one end of the pipe-like member for emitting a pulse-like sound wave in the pipe-like member;
a sound collecting means for collecting, at the one end of said pipe-like member, sound waves reflected at another end of said pipe-like member;
means closing the one end of the pipe-like member and operatively coupling the sound emitting means and the sound collecting means with an interior of the pipe-like member;
means closing the other end of the pipe-like member;
a temperature detecting means for detecting a temperature in said pipe-like member;
memory means for storing a sonic velocity value at a reference temperature of a gas present in said pipe-like member; and
calculating means for calculating the length of said pipe-like member from a time between emission of said pulse-like sound waves and collection of the sound waves and a sonic velocity value which is obtained from said memory means.

15. An acoustic pipe length measuring apparatus comprising:

sound emitting means for emitting a pulse-like sound wave in a pipe-like member having a length at one end of the latter, said sound wave having a wave length $\lambda$ which is set to satisfy the following expression:

$$0.257d + 0.971 < \lambda < \frac{2\pi\epsilon}{\sqrt{\frac{2}{n}}}$$

$$\epsilon \leq v\Delta t$$

where
- d is the bore diameter of pipe-like member,
- n is the signal-to-noise ratio in measuring apparatus,
- v is the sonic velocity (m/s) in the pipe-like member for a given gas which is present in the pipe-like member,
- $\Delta t$ is the sampling time in measuring apparatus, and
- $\epsilon$ is the margin of error in measurement, inherent to measuring apparatus;

sound collecting means for collecting, at the one end of said pipe-like member, sound waves reflected at another end of said pipe-like member;

temperature detecting means for detecting a temperature in said pipe-like member;

memory means for storing sonic velocity values at a reference temperature for a plurality of gases which may be present in said pipe-like member; and calculating means for calculating the length of said pipe-like member from the time between emission of said pulse-like sound waves and collection of the sound waves and a sonic velocity value which has been selected for the given gas which is present in the pipe-like member.

16. An acoustic pipe length measuring apparatus for measuring the length of a pipe-like member which may hold at least one of a plurality of different gases comprising:

sound emitting means for emitting a pulse-like sound wave of a wave length $\lambda$ in the pipe-like member at one end of the latter, said sound emitting means including synchronous signal generating means for controlling a frequency of the pulse-like sound wave so that the wave length $\lambda$ satisfies the expression:

$$0.257d + 0.971 < \lambda < \frac{2\pi\epsilon}{\sqrt{\frac{2}{n}}}$$

$$\epsilon \leq v\Delta t$$

where
- d is the bore diameter of pipe-like member,
- n is the signal-to-noise ratio in measuring apparatus,
- v is the sonic velocity (m/s) for the one gas in the pipe-like member for a given gas,
- $\Delta t$ is the sampling time in measuring apparatus, and
- $\epsilon$ is the margin of error in measurement, inherent to measuring apparatus;

sound collecting means for collecting, at the one end of said pipe-like member, sound waves reflected at another end of said pipe-like member;

means for storing sonic velocity values for the gases which may be present in said pipe-like member; and calculating means for calculating the length of said pipe-like member from the time between emission of said pulse-like sound waves and collection of the sound waves and the sonic velocity value for the at least one gas which is present in said pipe-like member.

* * * * *